US005394535A

United States Patent [19]

Ohuchi

[11] Patent Number: 5,394,535

[45] Date of Patent: Feb. 28, 1995

[54] MEMORY ACCESS CONTROL CIRCUIT WITH AUTOMATIC ACCESS MODE DETERMINATION CIRCUITRY WITH READ-MODIFY-WRITE AND WRITE-PER-BIT OPERATIONS

[75] Inventor: Mitsurou Ohuchi, Tokyo, Japan

[73] Assignee: NEC Corporation, Tokyo, Japan

[21] Appl. No.: 68,578

[22] Filed: May 27, 1993

Related U.S. Application Data

[63] Continuation of Ser. No. 512,996, Apr. 23, 1990, abandoned.

[30] Foreign Application Priority Data

Apr. 21, 1989 [JP] Japan .................................. 1-102458

[51] Int. Cl.⁶ .............................................. G06F 12/00

[52] U.S. Cl. ............................. 395/425; 364/DIG. 1; 364/259.7; 364/252.5; 364/246.7; 395/400

[58] Field of Search ... 364/200 MS File, 900 MS File; 395/425

[56] References Cited

U.S. PATENT DOCUMENTS

| | | | |
|---|---|---|---|
| 3,693,165 | 9/1972 | Reiley et al. | 395/425 |
| 4,158,227 | 6/1979 | Baxter et al. | 395/425 |
| 4,663,728 | 5/1987 | Weatherford et al. | 395/425 |
| 4,680,730 | 7/1987 | Omoda et al. | 395/425 |
| 4,797,814 | 1/1989 | Brenza | 395/425 |
| 4,847,758 | 7/1989 | Olson et al. | 395/425 |
| 4,905,188 | 2/1990 | Chuang et al. | 395/425 |
| 4,984,183 | 1/1991 | Ohuchi | 395/134 |
| 4,999,620 | 3/1991 | Ishii | 340/799 |
| 5,068,781 | 11/1991 | Gillett, Jr. et al. | 395/325 |
| 5,091,846 | 2/1992 | Sachs et al. | 395/250 |
| 5,142,637 | 8/1992 | Harlin et al. | 395/425 |
| 5,159,676 | 10/1992 | Wicklund et al. | 395/425 |

*Primary Examiner*—Joseph L. Dixon
*Assistant Examiner*—Matthew M. Kim
*Attorney, Agent, or Firm*—Foley & Lardner

[57] ABSTRACT

A memory access control circuit determines an optimum memory access mode and performs the optimum memory access mode without requiring additional data from the data processing unit. The circuit performs a plurality of memory access operations, the number of which is larger than the number of access modes designated by the data processing unit, and decides automatically which memory access is to be performed, and independently executes the appropriate memory access. The memory access control circuit provides memory access control functions which make it particularly suited for use in a graphics display system.

4 Claims, 14 Drawing Sheets

| DRAWING MODE | OPERATION | RM SIGNAL |
|---|---|---|
| REPLACE | W=S | H |
| INVERTED-REPLACE | W=$\overline{S}$ | H |
| LOGIC OR | W=S∨D | L |
| LOGIC AND | W=S∧D | L |
| INVERSION | W=$\overline{D}$ | L |
| INCREMENT | W=D+1 | L |
| DECREMENT | W=D-1 | L |

FIG. 5

| RW | RM | MT | M0=H | M1=H | M0=M1=L |
|---|---|---|---|---|---|
| H | H | 0 | NOP | W | RMW |
| | | 2 | NOP | W | WPB |
| | L | 0 | NOP | RMW | RMW |
| | | 2 | NOP | RMW | RMW |
| L | X | 0 | R | | |
| | | 2 | R | | |

NOP :NO OPERATION
W :RANDOM WRITE ACCESS
R :RANDOM READ ACCESS
RMW :READ-MODIFY-WRITE ACCESS
WPB :WRITE-PER-BIT ACCESS
X :DON'T CARE

FIG. 7

| RW | MT | SP=H | | SP=L |
|---|---|---|---|---|
| | | SA=H | SA=L | |
| H | 0 | W | RMW | RMW |
| | 1 | PW | PRW | RMW |
| L | 0 | NOP | R | R |
| | 1 | NOP | PR | R |

NOP :NO OPERATION
W :RANDOM WRITE ACCESS
R :RANDOM READ ACCESS
RMW :READ-MODIFY-WRITE ACCESS
PR :PAGE-MODE READ ACCESS
PW :PAGE-MODE WRITE ACCESS
PRW :PAGE-MODE READ-MODIFY-WRITE ACCESS

| | 1 | 2 | 3 | 4 | 5 | 6 | DRAWING TIME (nsec) |
|---|---|---|---|---|---|---|---|
| EXAMPLE 1 | RMW | RMW | RMW | RMW | RMW | RMW | 1500 |
| EXAMPLE 2 | WPB | WPB | WPB | WPB | WPB | WPB | 900 |
| EXAMPLE 3 | RMW | W | W | RMW | RMW | W | 1200 |
| EXAMPLE 4 | RMW | PW | PW | RMW | PRW | PW | 800 |

| | i | i+1 | i+2 | i+3 | DRAWING TIME (nsec) |
|---|---|---|---|---|---|
| EXAMPLE 1 | RMW | RMW | RMW | RMW | 1000 |
| EXAMPLE 2 | RMW | PW | PW | PRW | 500 |
| EXAMPLE 3 | RMW | W | W | RMW | 800 |
| EXAMPLE 4 | WPB | W | W | WPB | 600 |

(READ-MODIFY-WRITE (RMW) ACCESS)

(WRITE-PER-BIT (WPB) ACCESS)

(READ (R) ACCESS)

(WRITE (W) ACCESS)

(NO-OPERATION (NOP))

(PAGE-MODE READ-MODIFY-WRITE (PRW) ACCESS)

(PAGE-MODE READ (PR) ACCESS - 2 CYCLES)

(PAGE-MODE WRITE (PW) ACCESS - 2 CYCLES)

MEMORY ACCESS CONTROL CIRCUIT WITH AUTOMATIC ACCESS MODE DETERMINATION CIRCUITRY WITH READ-MODIFY-WRITE AND WRITE-PER-BIT OPERATIONS

This application is a continuation of application Ser. No. 07/512,996, filed Apr. 23, 1990, now abandoned.

BACKGROUND OF THE INVENTION

The present invention relates to a memory access control circuit for performing an access operation to a memory in response to a request from a data processing unit and, more particularly, to such a control circuit for a graphic controller in a graphic display system for displaying characters, figures and so forth by means of a printer and/or a raster scan type cathode ray tube (called hereinafter "CRT").

A memory access control circuit intervenes between a data processing unit and a memory and responds to an access request from the data processing unit to perform a data read/write operation on the memory in accordance with a designated one of various access modes.

Also in a graphics display system, a memory access control circuit intervenes between a drawing control unit, which performs a drawing data processing operation on characters, figures and so forth to be displayed, and a frame buffer memory, which temporarily stores character and figure data being currently displayed. The display of characters and figures on a CRT is performed by the drawing control unit which generates character and figure data to be displayed and writes them into the frame buffer memory through the memory access control circuit. While the access to the frame buffer memory is performed in word units, the actual drawing process is frequently performed only on one or few bits within the accessed word. This is because one pixel (picture element), which represents a unit of processing in the graphics display system, consists of one to four bits in general and thus one word includes a plurality of pixels. For instance, in drawing a line such as a straight line, a circle, an arc or the like, the number of pixels to be processed in one word is usually one (two or more in some cases). Therefore, only the data of a pixel or pixels to be processed within one word read out from the frame buffer memory are modified or updated in accordance with line type data and/or color data to be displayed and the word containing the modified or updated data bits is then written back to the same address of the buffer memory. In this case, three successive steps is required, the first step is reading one word of data from the frame buffer memory, the second step is modifying certain pixel data, and the third step is writing the word including modified data bits back to the memory. An operation for performing these three steps is hereinafter called "read-modify-write (or RMW) access".

On the other hand, such a memory has been developed and put into practical use, which has improved access modes for shortening access time. One of them is a write-per-bit (WPB) access mode. According to this access mode, by supplying the memory with only modifying data together with mask data for designating a bit or bits to be modified within one word, the data of the bit or bits designated by the mask data are automatically modified inside the memory in accordance with the modifying data. If the memory having WPB access is employed, therefore, the operation required of the graphic controller is reduced to only one step of supplying the modifying data and the mask data to the memory. The graphic controller is free from the data read access operation .and the data modifying operation. In other words, WPB access causes the same operation as RMW access with the same access speed as a random write access. WPB access is effective in the process of drawing a line above, in which the original data of the pixel or pixels to be processed are not required.

Another of the high-speed access modes is a page-mode access, in which a memory address is divided into a row address defined as a page address and a column address defined as a word address within a page so that the case of accessing successive words within one page, the row address for the second and later words is not required. The graphics display system also has a bit-block-transfer (BitBlt) function which transfers data stored in a certain area (i.e., a source area) to another area (i.e., a destination area), and thus the page-mode access is effective in this function.

Thus, by selecting the optimum access mode of the memories employed in the graphics display system in accordance with the drawing operation to be performed, the memory access speed and efficiency are greatly improved. The selection of the access mode to be used can be carried out by the drawing algorithms of the drawing control unit in response to the required drawing operations.

However, the kind of memory (and thus the access modes thereof) actually employed in a system depends on the specification of the system to be structured. That is, it is impossible for the drawing control unit to predict the kind of memory, which will be employed in the system, at the time of determining the drawing algorithms thereof. Moreover, in current systems, the memory, which is an object of the drawing operation by the drawing control unit, is not restricted to the frame buffer memory, but is spread over a so-called system memory which is used by CPU operating as the host processor of the system. Since the access frequency to the system memory by the CPU is considerably higher than that by the graphic controller, an ordinary dynamic memory (DRAM) not having WPB access mode is used as the system memory in view of the cost. Further, a system bus coupled with the system memory cannot generally meet the page-mode access requirements. Thus, there is one case where ordinary DRAMs are employed as both the frame buffer memory and the system memory, and another case where a memory having WPB access mode and/or the page-mode access is employed as the frame buffer memory and ordinary DRAM is employed as the system memory.

One approach is to prepare a plurality of drawing algorithms corresponding to the memory access modes for each one of the respective drawing operations. However, the preparation of a plurality of drawing algorithms causes the expansion of firmware for performing the respective algorithms, so that the cost of the drawing control unit is increased. Moreover, the unit is required to detect conditions and circumstances for selecting the optimum drawing algorithm, so that the burden of the application software is increased. Furthermore, if a new memory having a higher access speed mode is provided, the drawing control unit would have to be redesigned.

SUMMARY OF THE INVENTION

Therefore, an object of the present invention is to provide a memory access control circuit which determines an optimum memory access mode and performs the determined memory access mode without requiring various memory access mode designation data from a data processing unit.

Another object of the present invention is to provide a graphic controller having an improved memory access control circuit and which performs the appropriate memory access for a particular drawing operation in accordance with the type of memory employed in a system.

Still another object of the present invention is to provide a memory access control circuit which can perform a plurality of memory access operations, the number of which is larger than the number of access modes designated by a drawing control unit, and which judges automatically which memory access is to be performed and executes the judged memory access.

A memory access control circuit according to the present invention includes an "access mode determining information generator" receiving an access request from a data processing unit and generating information for determining an access mode to be performed by judging the access information of the access request. The memory access control circuit further includes an access sequence control circuit having a function of performing memory access operations in accordance with not only an access mode designated by the access information of the access request but also other access modes. The access sequences control circuit selects one of the access modes in response to the access mode determining information from the information generator to perform the memory access operation in accordance with the selected access mode.

Thus, the access sequence control circuit independently manages a plurality of access modes and performs a memory access operation by selecting the approximate access mode. The data processing unit such as a drawing control unit is thereby free from the management of all the access modes. In a graphics display system, the access mode determining information can be derived from an access address, mask data and so forth.

BRIEF DESCRIPTION OF THE DRAWINGS

The above and other objects, advantages and features of the present invention will be more apparent from the following description taken in conjunction with the accompanying drawings, in which

FIG. 5 is a diagram representative of access modes performed by an access sequence control circuit shown in FIG. 4;

FIG. 7 is a diagram representative of access modes performed by an access sequence control circuit shown in FIG. 6;

DETAILED DESCRIPTION OF THE EMBODIMENTS

Figure 1:
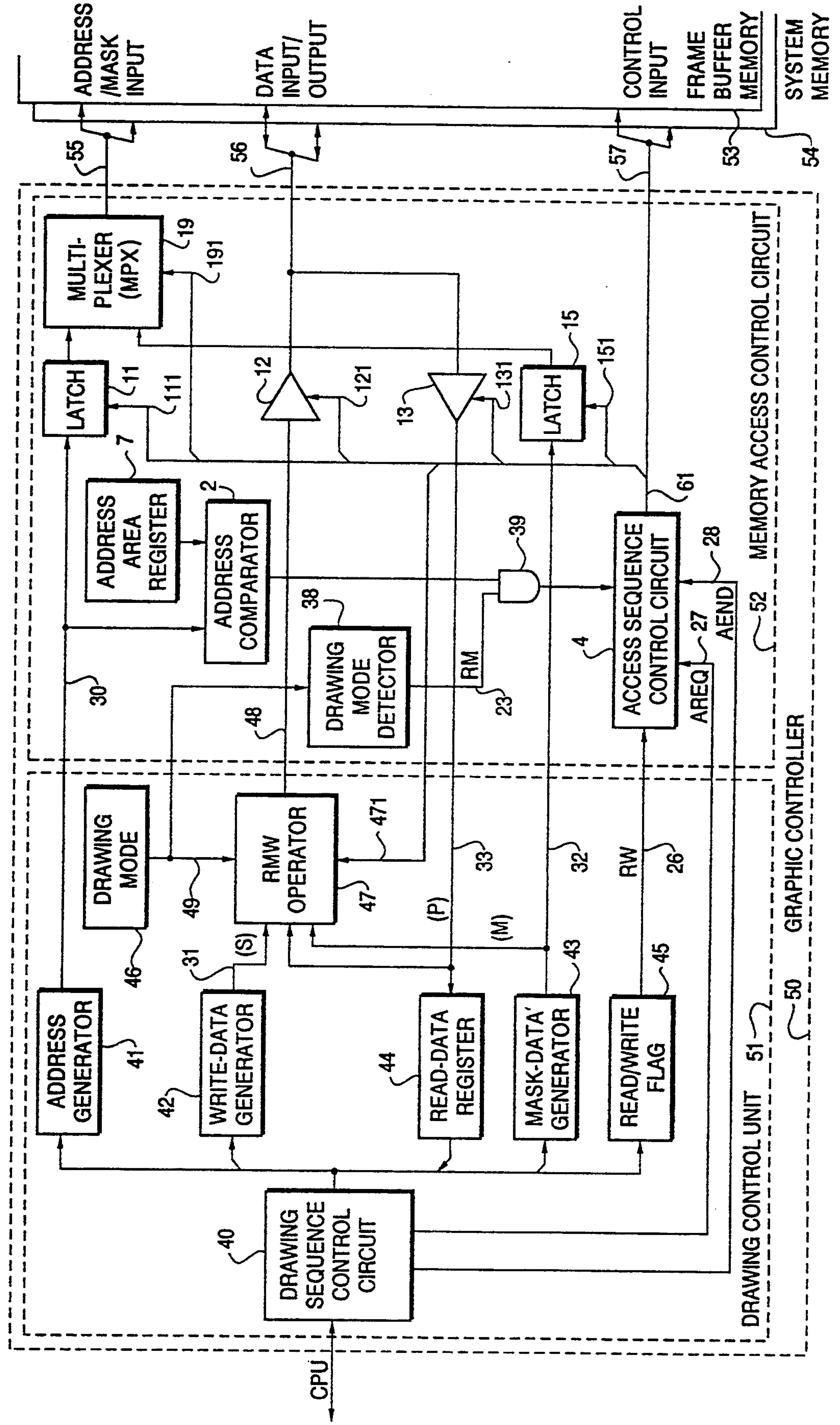
FIG. 1 is a block diagram representative of a graphic controller including a memory access control unit according to a first embodiment of the present invention.

Referring now to FIG. 1, a memory access control circuit 52 intervenes between a drawing control unit 51 and each of frame buffer memory 53 and a system memory 54 to perform an access operation on the memory 53 and/or 54 in response to an access request from the drawing control unit 51. The drawing control unit 51 and memory access control circuit 52 are integrated on a single semiconductor chip as a graphic controller 50. If desired, the unit 51 and circuit 52 may be fabricated on separate semiconductor chips, respectively. The drawing control unit 51 responds to commands from a CPU (not shown) and executes drawing operations in accordance with drawing algorithms prepared therein.

Figures 2, 3:
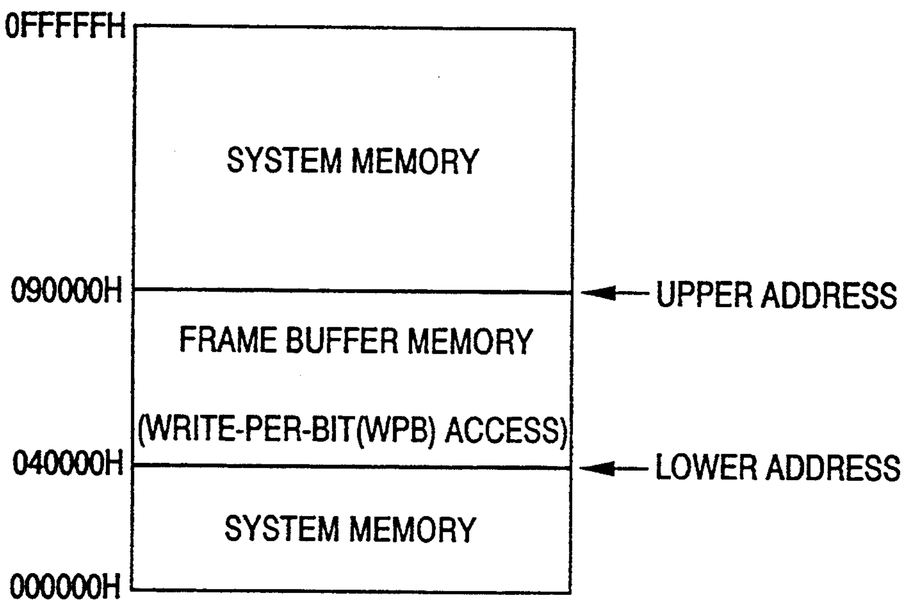
FIG. 2 is a diagram representative of the kind of operations performed by RMW operator shown in FIG. 1.
FIG. 3 is a memory map representative of address spaces allocated to a frame buffer memory and a system memory shown in FIG. 1.

In order to initiate the drawing operation, the CPU sends drawing mode data into a drawing register 46 and further issues a drawing parameter and a drawing command to a drawing sequence control circuit 40. The drawing command instructs a drawing operation to be executed such as a line drawing, a painting of a polygon, BitBlt operation and so forth. The drawing parameter includes drawing start and/or end addresses, a line type pattern data, color data and the like required for performing the instructed drawing operation. The drawing mode data designates a kind of operation on write-data (S) 31 from a write-data generator 42 and original data (D) 33 of a pixel or pixels to be processed. Seven kinds of operations are shown in FIG. 2, as typical examples. The operation designated by the drawing mode data is performed by a RMW operator 47. It should be noted that the RMW operator 47 is further supplied mask-data (M) 32 from a mask data generator 43. Thus, RMW operator 47 performs the following operation on the write-data 31, "S" the original data 33, "D" and the mask data 32, "M", and produces the resultant data 48, "W":

$$W=(\overline{M}\wedge D)\vee(M\wedge(S\ OP\ D))$$

wherein "$\wedge$" represents a logic AND operation; "$\vee$" represents a logic OR operation; and "OP" represents the operation designated by the drawing mode data (see FIG. 2). The original data (D) 33 is read out from the memory 53 or 54 and supplied to RMW operator 47. The drawing sequence control circuit 40, when receiving the drawing command and parameter, controls an address generator 41, write-data generator 42 and mask data generator 43 to generate a drawing (access) address 30, write-data 31 and mask data 32 corresponding to the pixel or pixels to be processed in accordance with the drawing algorithms realized by firmware provided therein. Since the construction and operation of the drawing control unit 51 is well known in the art and is not related directly to the feature of the present invention, further detailed description will be omitted.

The memory access control circuit 52 accesses the memories 53 and 54 in response to the data and control signals from the drawing control unit 51. Included in the circuit 52 is an access sequence control circuit 4 which receives a read/write signal (RW) 26 from a read/write flag 45 of the control unit 51. RW signal 26 designates an access mode. In the present embodiment, the low level of RW signal 26 designates a random read access (R access), whereas the high level thereof designates RMW (read-modify-write) access. The drawing algorithms of the drawing sequence control circuit 40 are thus determined such that the drawing operations responsive to the drawing commands are performed by use of R access and RMW access. The actual access operation is performed in synchronism with an access request signal (AREQ) 27, and the drawing sequence control circuit 40 is informed of the completion of one access operation by an access end signal (AEND) 28 returned from the access sequence control circuit 4. The access sequence control circuit 4 further receives the output of an AND gate 39 and determines an access mode to be performed in response to the level of RW signal 26 and the output level of the AND gate 39 to shorten the access time by effective use of access modes built in the frame buffer memory 53. One input of the AND gate 39 is supplied with the output of an address comparator 2 which in turn detects that the output 30 of the address generator 41, (i.e. a memory address to be accessed) is within an address range preset in an address area resister 7. In this embodiment, the frame buffer memory 53 is allocated in an address range from "040000H" to "090000H", as shown in FIG. 3. The mark "H" represents a hexadecimal notation. When a memory having WPB access mode is employed as the frame buffer memory 53, the address area register 7 is set with numbers "04H" and "09H" as the most significant eight bits of address information at an initial setting state by the CPU. If an ordinary DRAM which does not have WPB access mode, is employed as the frame buffer memory 53, the register 7 is set with a default number. Accordingly, if the memory address 30 to be accessed is in the frame buffer memory 53 having WPB access mode, the comparator 2 outputs a high level which is in turn supplied to one input of the AND gate 39. On the other hand, when a memory not having WPB access mode is employed as the frame buffer memory 53 or when the memory address 30 in the system memory 54, the output of the comparator 2 takes the low level. The other input of the AND gate 39 is supplied with an output signal (RM) 23 of a drawing mode detector 38. RM signal 23 takes the high level only when the operation performed by RMW operator 47 does not require the data of the pixels to be processed, as shown in FIG. 2 by the "replace" and "inverted-replace" operations. Thus, when the pixels to be processed are contained in the frame buffer memory 53 having WPB access mode and the designated drawing mode is a replace or inverted-replace operation, the output of the AND gate 39 is changed to the high level. Even when the drawing control unit 51 designates RMW access by the high level of RW signal 26, if the output of the AND gate 39 is the high level, the access sequence control circuit 4 changes a set of access control signals 61 at its output from RMW access mode to WPB access mode. The set of access control signals 61 includes a latch-enable signal 111 for a latch circuit 11 which temporarily stores the memory address 30, a data output-enable signal 121 for a tristate output buffer 12 which transfers the output 48 of RMW operator 47, a data input-enable signal 131 for a tristate input buffer 13 which fetches read data from the memories 53 and 54, a latch-enable signal 151 for a latch circuit 15 which temporarily stores the mask data 32, an address/$\overline{\text{mask}}$ switching signal 191 for a multiplexer (MPX) 19 which outputs either one of the memory address or mask data, and an operation timing control signal 471 for controlling the operation timing of RMW operator 47. The set of access control signals 61 further includes a chip select signal for the memories 53 and 54 and an R/$\overline{\text{W}}$ signal indicating data read or write operation, which are supplied via a control bus 57 to the memories 53 and 54. The address/$\overline{\text{mask}}$ signal is also supplied to the memories 53 and 54 via the bus 57. Buses 55 and 56 are address and data buses, respectively. The address bus 55 is used as a multiplexed bus for a memory address and mask data if a memory having WPB access mode is employed.

Assume now that the drawing control unit 51 request RMW access to the memory access control circuit 52. At this time, if the AND gate 39 is in the low level, the access sequence control circuit 4 performs a RMW access operation in accordance with a timing chart shown in FIG. 10. Specifically, an access to be actually performed is determined against an access request from the control unit 51 in T1 state, and the determined access in then initiated at T2 state. In this description, since RMW has been determined as the access mode, the data read out from the accessed word is transferred to RMW operator 47 in the T4 state, and in the T5 state RMW operator 47 performs the operation designated by the drawing mode data on the data of the pixel or pixels within the accessed word, followed by the operation of the resultant data 48 being written back to the same address in T6 state. This T6 state corresponds to T1 state for the next memory access.

Figure 11:
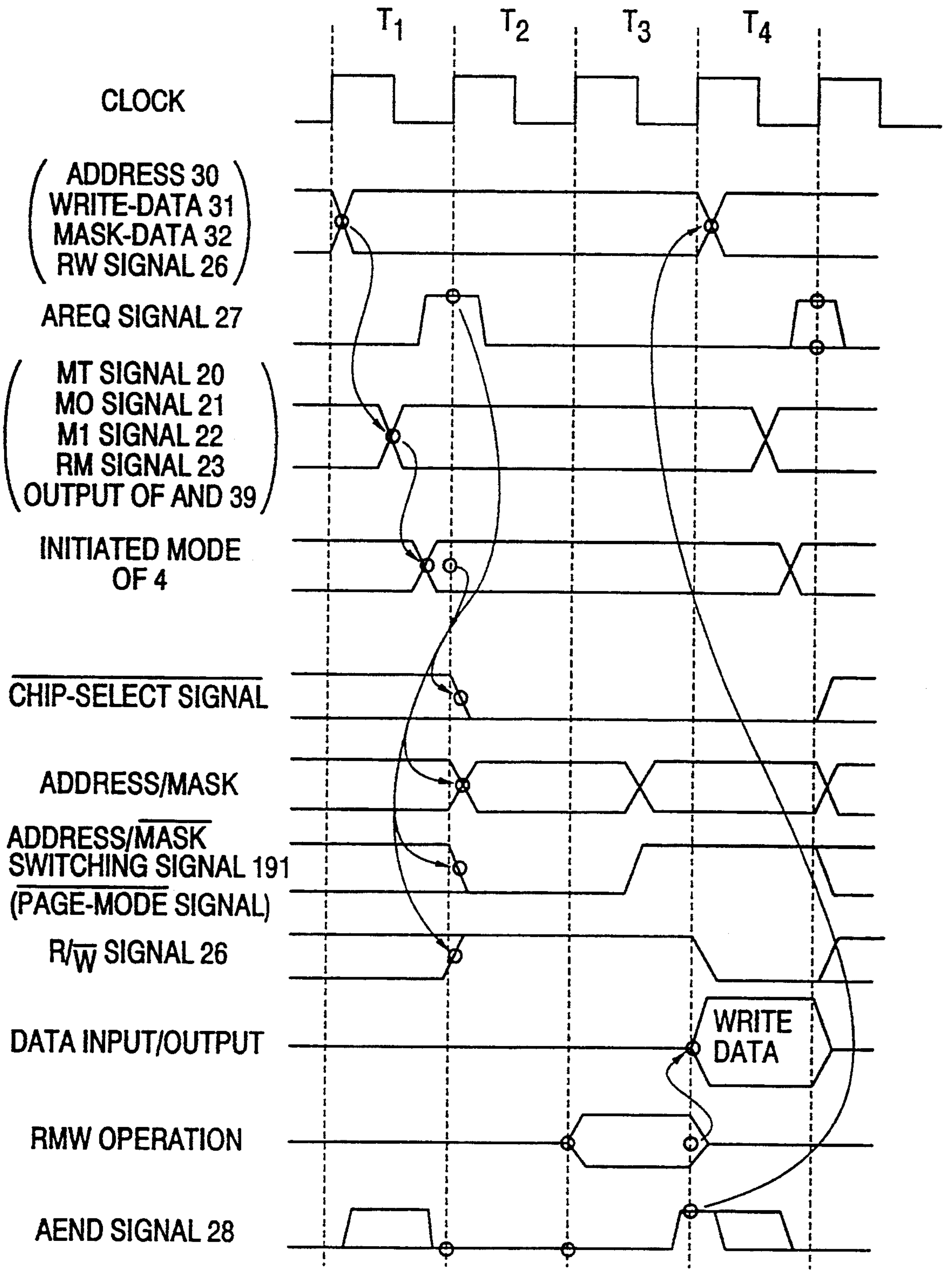
FIG. 11 is a timing chart representative of WPB access.

On the other hand, if AND gate 39 changes its output to the high level in response to an access request from the control unit 51, the access sequence control circuit 4 performs a WPB access operation against a RMW access request, in accordance with a timing chart shown in FIG. 11. Specifically, in T2 state, the address/$\overline{\text{mask}}$ switching signal 191 is changed to the low level to allow the mask data 32 to be transferred onto the bus 55. At an intermediate time point in T3 state, the switching signal is returned to the high level, so that the memory address 30 is transferred onto the bus 55. During T3 state, RMW operator 47 performs the replace operation and the output data 48 thereof is transferred onto the bus 56 in T4 state. In WPB access, T4 state corresponds to T1 state of a next memory access. Thus, RMW access requires 6 states, whereas WPB access is completed in 4 states. When the control unit 51 requests R access by the low level of RW signal 26, the access sequence control unit 4 performs R access in accordance with a timing chart shown in FIG. 12, irrespective of the output level of the AND gate 39. The data read out of the accessed word is stored into the register 44. R access requires 4 states, similar to WPB access.

Figure 4:
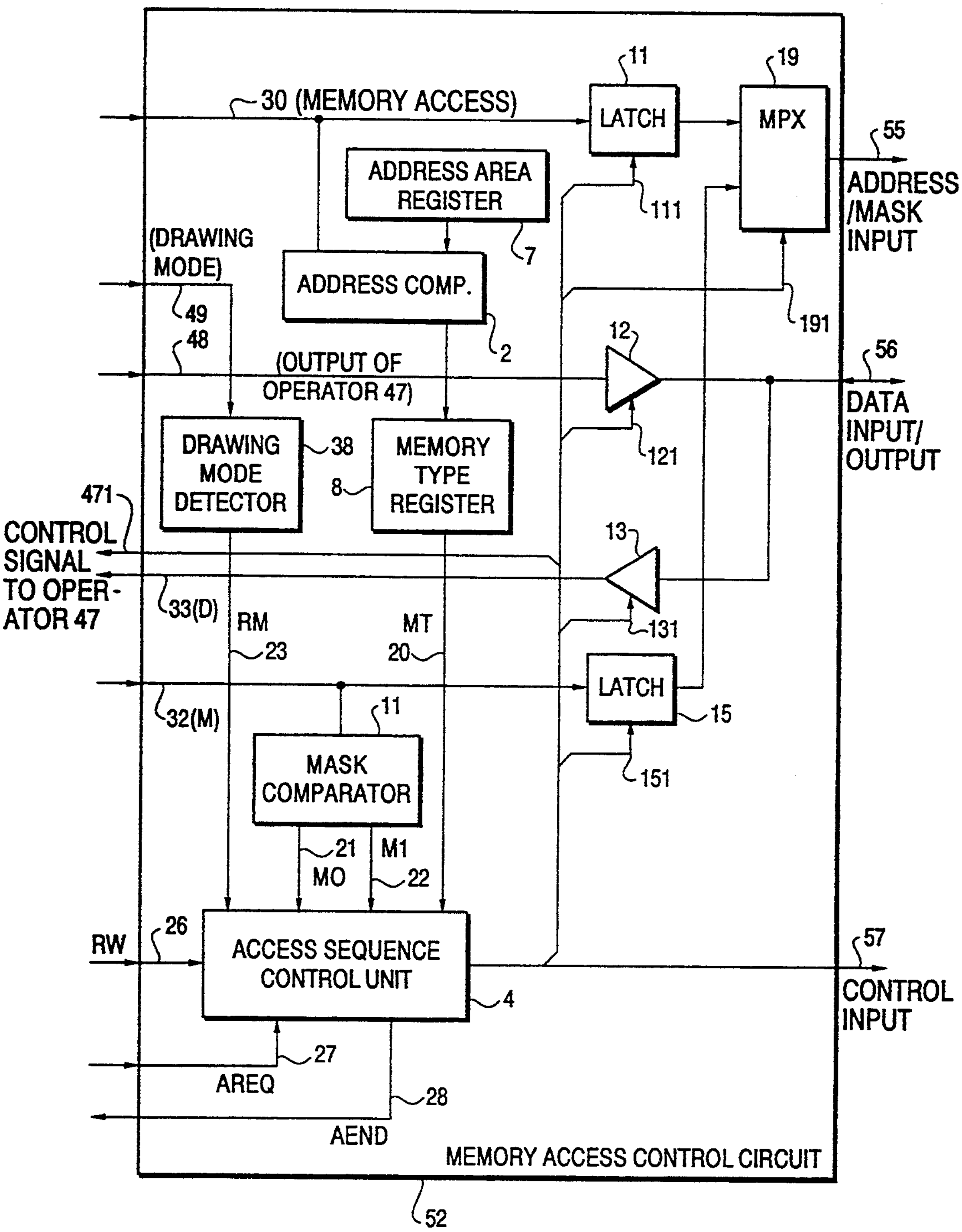
FIG. 4 is a block diagram representative of a second embodiment of the present invention.

Turning to FIG. 4, there is shown a block diagram of a memory access control unit according to a second embodiment of the present invention, wherein the same constituents as those shown in FIG. 1 are denoted by the same reference numerals to omit further description thereof. The control circuit 52 according to this embodiment further includes a mask comparator 1 and a memory type register 8. The mask comparator 1 detects or compares the content of the mask data 32 and outputs MO signal 21 when all the bits of the mask data 32 are "0" and M1 signal 22 when they are all "1". The memory type register 8 stores codes representing the kinds of memories employed as the frame buffer memory 53 and system memory 54. In this embodiment, the codes to be stored in the register 8 are determined as follows:

0: DRAM not having WPB access mode
2: DRAM having WPB access mode

When the output of the address 2 is at the high level, the code "2" is supplied from the register 8 to the access sequence control circuit 4. On the other hand, the low level output of the address comparator 2 causes the memory type register 8 to supply the code "0" to the access sequence control circuit 4.

In operation, at an initial state, the CPU writes upper and lower addresses of the frame buffer memory 53 into the register 7 and the memory type codes into the register 8. When the CPU encounters a drawing instruction, it writes the drawing mode data into the register 46 and issues the drawing command and drawing parameters to the drawing control unit 51. In response thereto, the drawing control unit 51 starts the execution of the drawing operation, as mentioned above. Specifically, the address generator 41 generates a memory address 30 designating a word containing a pixel or pixels to be processed and the mask generator 43 generates mask data 32 representative of the pixel or pixels to be processed. In case of R access, the flag 45 is set with "0" to change RW signal 26 to the low level. On the other hand, in case of RMW access, the flag 45 is set with "1" to produce the high level RW signal 26. Also in RMW access, the write-data generator 42 generates write-data 31 for drawing. The above data and signals 30, 48, 32 and 26 are supplied to the memory access control circuit 52 together with AREQ signal 27.

In response to AREQ signal 27, the control circuit 52 initiates the access mode determination operation and the access performing operation with reference to the supplied data and signal. More specifically, the mask comparator 1 detects that the contents of the mask data 32 are all "0" or all "1" and supplies MO signal 21 and M1 signal 22 to the access sequence control circuit 4. The address comparator 2 detects whether or not the memory address 30 is within the address region allocated to the frame buffer memory 53 and supplies the detection output to the register 8. The code "0" or "2" are thus supplied from the register 8 to the access sequence control circuit 4 as MT signal 20. The drawing mode detector 38 detects the content of the drawing mode data 49 from the register 46 and supplies RM signal 23 to the access sequence control circuit 4. RM signal 23 takes the high level when a replace or inverted-replace operation is designated and takes the low level when another operation is designated, as shown in FIG. 2. The MO signal 21, M1 signal 22, MT signal 20 and RM signal 23 are used as access mode determination (or selection) information for determining an optimum and adequate memory access mode. In response to the access mode determination information, the access sequence control circuit 4 selects and determines one of a plurality of access modes provided therein in accordance with the relationship shown in FIG. 5 and described in detail in the following:

I. RMW-access request (RW=H)

Unless the conditions (1), (2) and (3) below are satisfied, RMW access mode is selected as an access mode to be performed.

(1) MO=H (all the bits of mask data 32 are "0")

This condition represents that none of the data bits of a word to be accessed are required to be updated or modified. Therefore, the memory access can be omitted. Namely, RMW access request is changed to no-access-operation (NOP).

(2) M1=H and RM=H (all the bits of mask data 32 are "1" and replace or inverted-replace operation is designated).

This condition represents that all the bit data of a word to be accessed are replaced by the write-data 31 or inverted thereof. Accordingly, a random write (W) access can be used. RMW access request is thus changed to W access.

(3) RM=H and MT=2 (a replace or inverted-replace operation is designated and the frame buffer memory 53 has WPB access mode).

RMW access request is thus changed to WPB access.

II. Read access request (RW=L)

A random read access (R) is required in all the cases.

Figure 10:
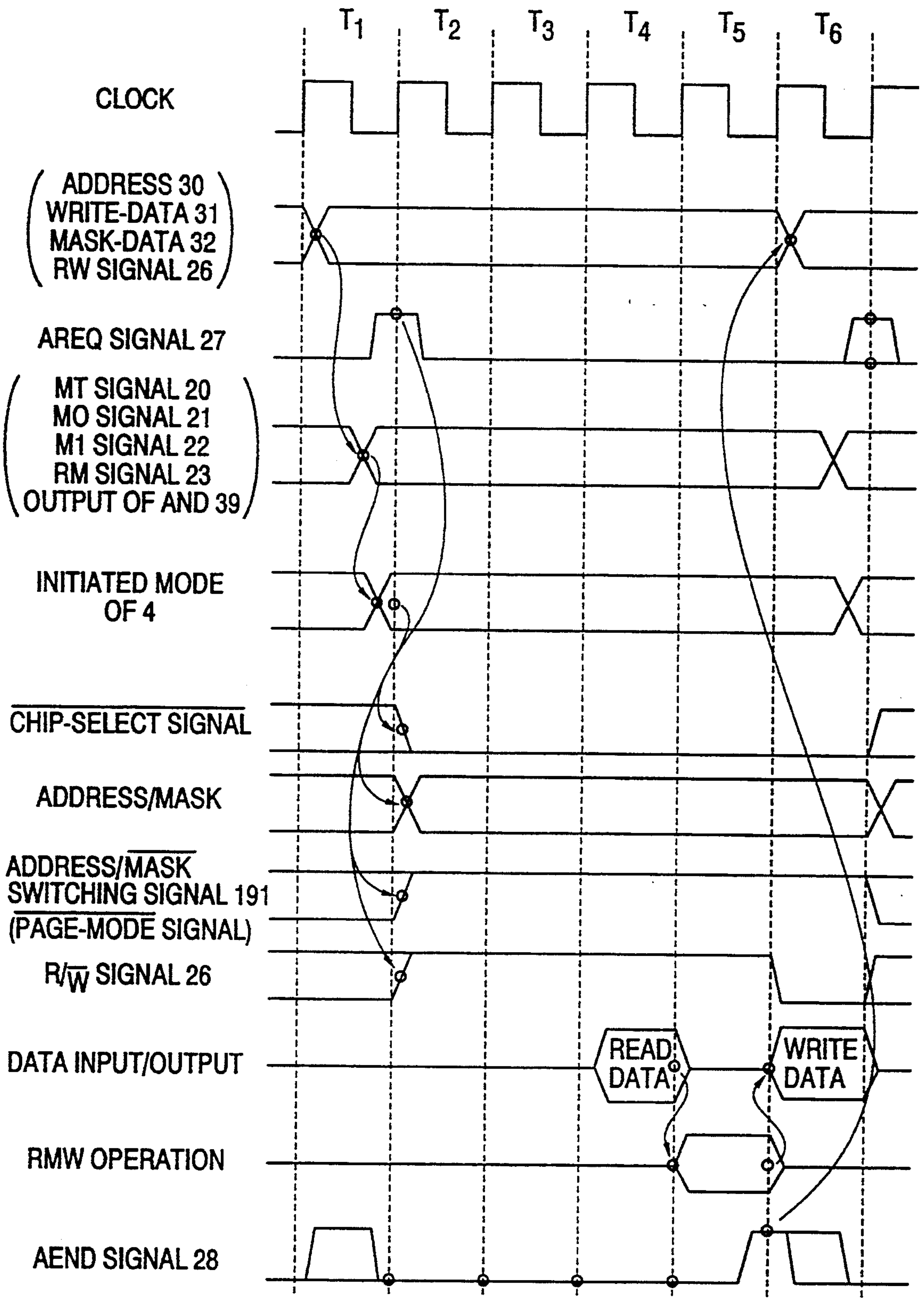
FIG. 10 is a timing chart representative of RMW access.
Figure 12:
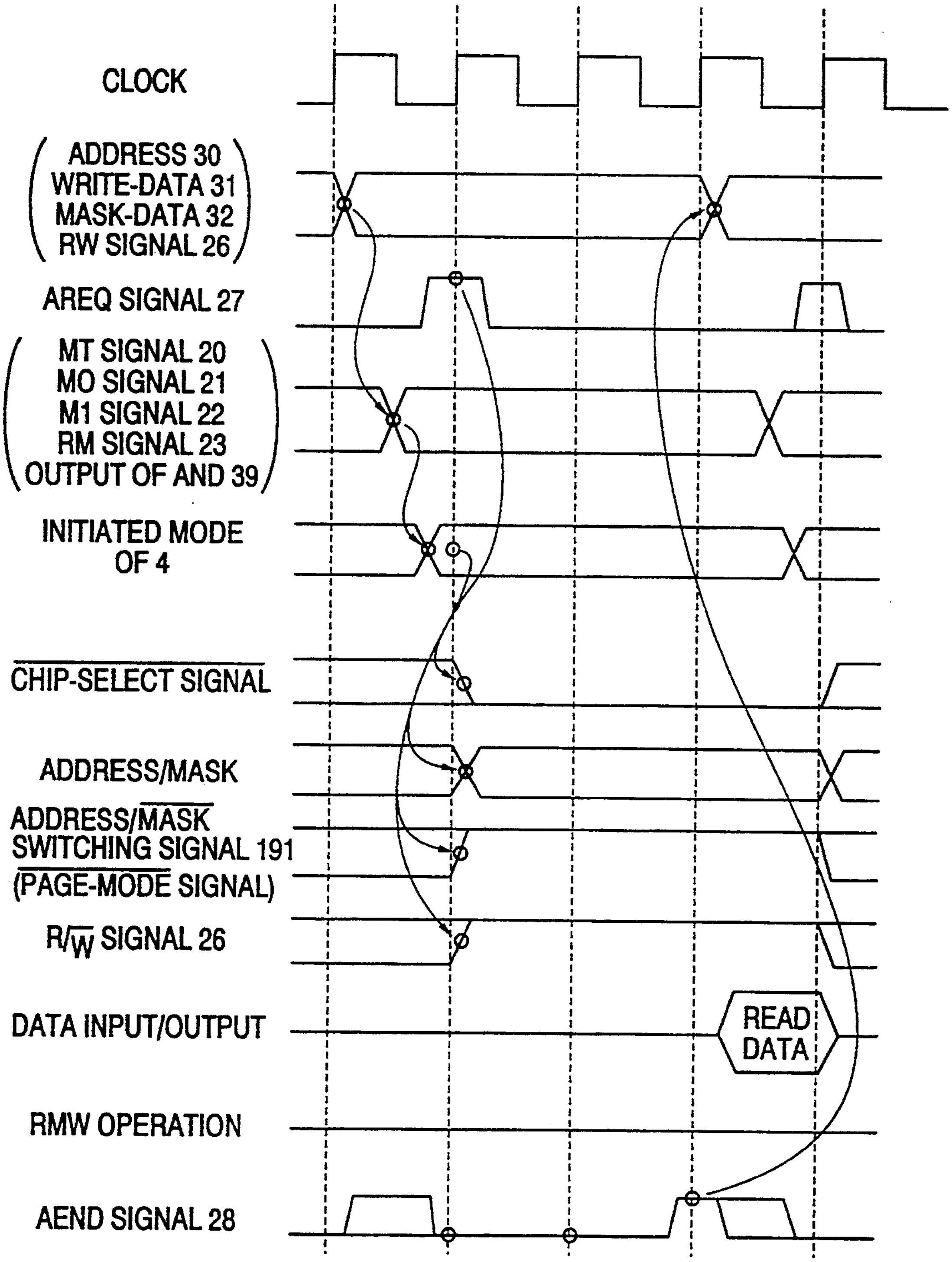
FIG. 12 is a timing chart representative of a random read (R) access.
Figure 13:
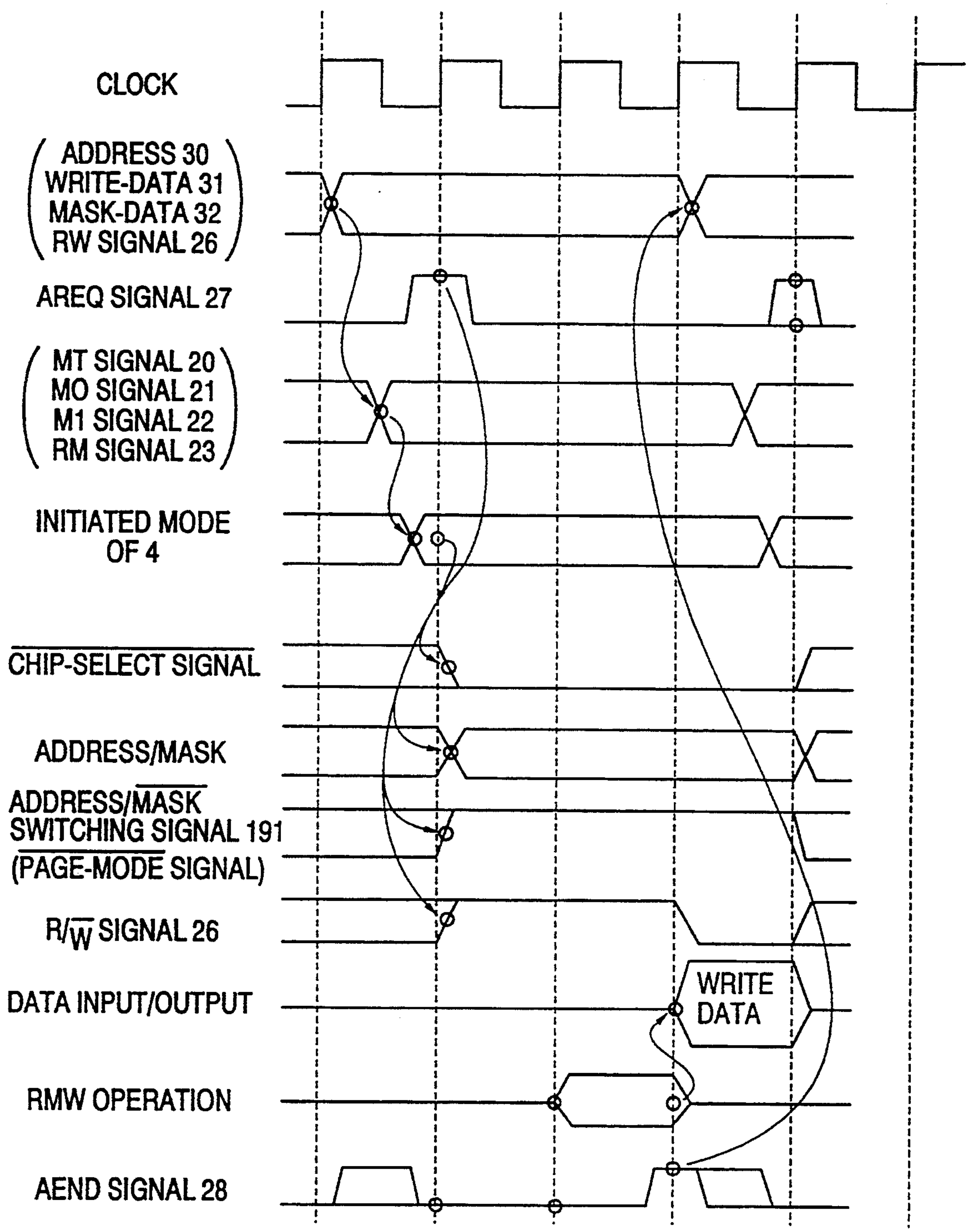
FIG. 13 is a timing chart representative of a random write (W) access.
Figure 14:
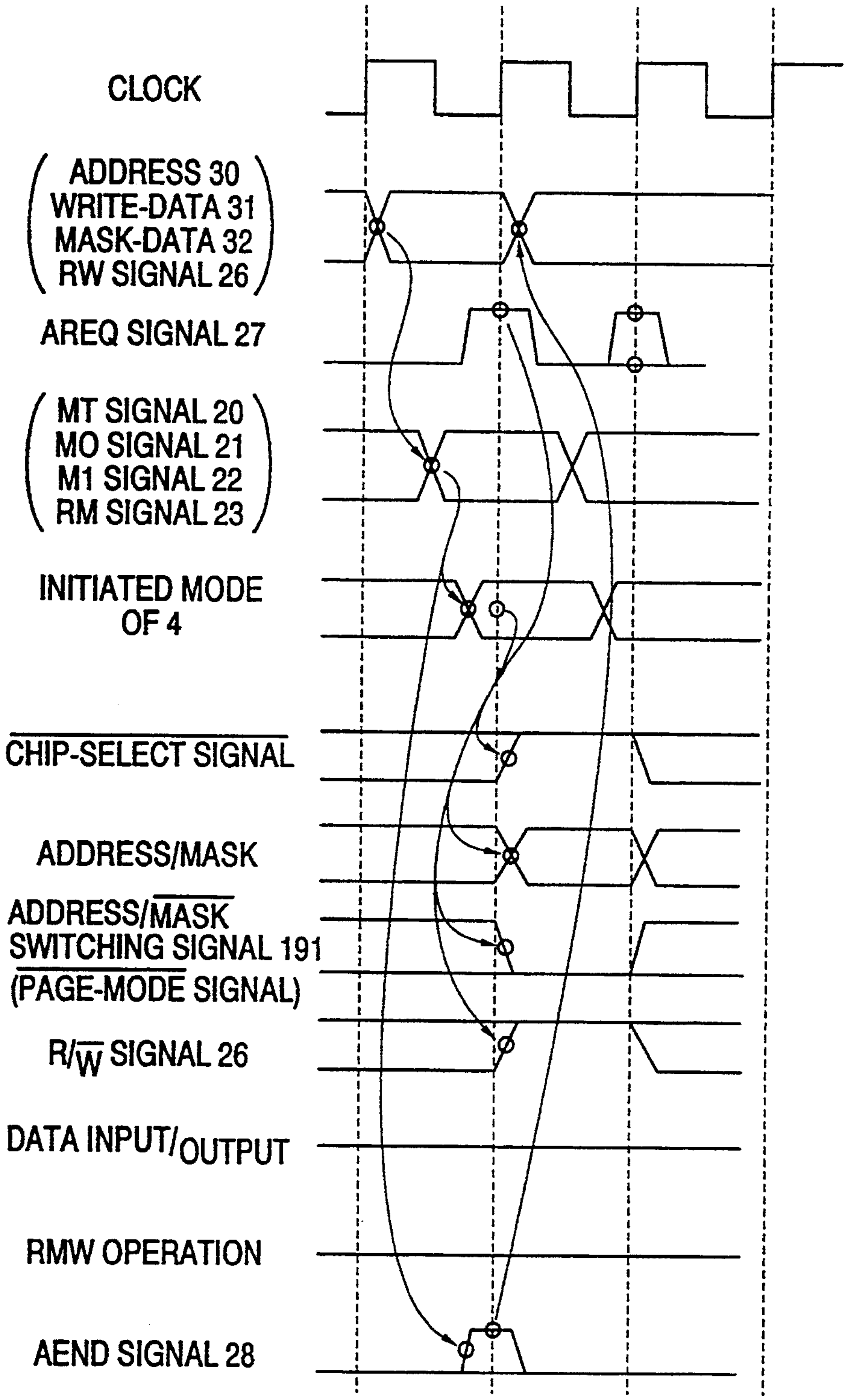
FIG. 14 is a timing chart of a no-access operation (NOP)

When the access mode to be used is determined, the access sequence control circuit 4 generates and supplies appropriate access control signals described above to the control bus 57, tristate buffers 12 and 13, latch circuits 11 and 15, MPX 19 and the operator 47 in order to perform a memory access of the selected access mode. The timing charts of RMW access, WPB access and R access are shown in FIGS. 10, 11 and 12, respectively. W access and NOP timings are shown in FIGS. 13 and 14, respectively. In response to the access control signals on the bus 57, a timing controller (not shown) provided in the memories 53 and 54 generates $\overline{RAS}$, $\overline{CAS}$, $\overline{WB}/\overline{WE}$ and $\overline{DT}/\overline{OE}$ signals for video RAM (VRAM) which has WPB access mode and is used as the frame buffer memory 53, and also generates $\overline{RAS}$, $\overline{CAS}$, $\overline{WE}$ and $\overline{OE}$ signals for ordinary DRAM which does not have WPB access mode and is used as the system memory 54, as is well known in the art.

Figure 8:
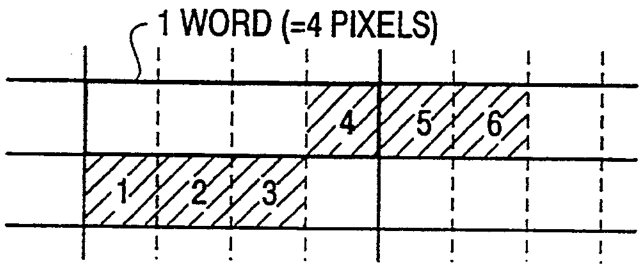
FIG. 8 is a diagram representative of several access modes in drawing a straight line.
Figure 9:
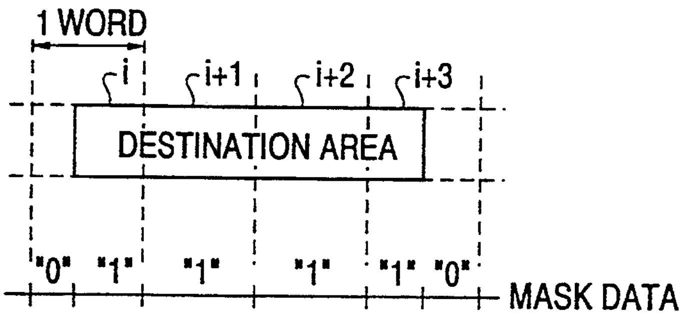
FIG. 9 is a diagram representative of some access modes in BitBlt drawing operation.

Referring to FIGS. 8 and 9, there are shown comparisons in timing between a case of employing a memory not having WPB access mode and a case of employing a memory having WPB access mode. FIG. 8 shows a straight line drawing operation, in which pixels 1 to 6 denoted by slanted lines becomes objects of this drawing operations. One word consists of four pixels, in this description. The line drawing operation is performed in pixel units, and therefore both MO and M1 signals 21 and 22 take the low level. In the case of employing DRAM not having WPB access mode as the frame buffer memory 53, MT signal 20 is held at the code "0". As a result, the memory access control circuit 52 selects and performs RMW access to each of the pixels 1 to 6 (see Example 1 in FIG. 8). On the other hand, in case of employing DRAM having WPB access mode as the memory 53, MT signal 20 is changed to the code "2". Therefore, the access sequence control circuit 4 selects and performs WPB access (see Example 2 in FIG. 8) in place of the RMW access request from the drawing control unit 51. FIG. 9 shows a destination area in BitBlt operation. This destination area consists of four successive words i, i+1, i+2 and i+3, but excludes the respective "0" portions of the words i and i+3. Example 1 in FIG. 9 indicates that RMW access operation is performed for all of the words i to i+3. Since the mask data for the words i+1 and i+2 are all "1", however the access sequence control circuit 4 performs W access operation on these words i+1 and i+2 (see Example 3 in FIG. 9). Further, in case of MT signal 20 indicating the code "2" the access sequence control circuit 4 performs WPB access operation on the words i and i+3. The access times of W, WPB and RMW accesses are as follows:

W access: 150 nsec

WPB access: 150 nsec

RMW access: 250 nsec

Thus, the access sequence control circuit 4 automatically selects an optimum access mode and then performs a memory access in accordance with the selected access mode. The access speed is thereby minimized.

Figure 6:
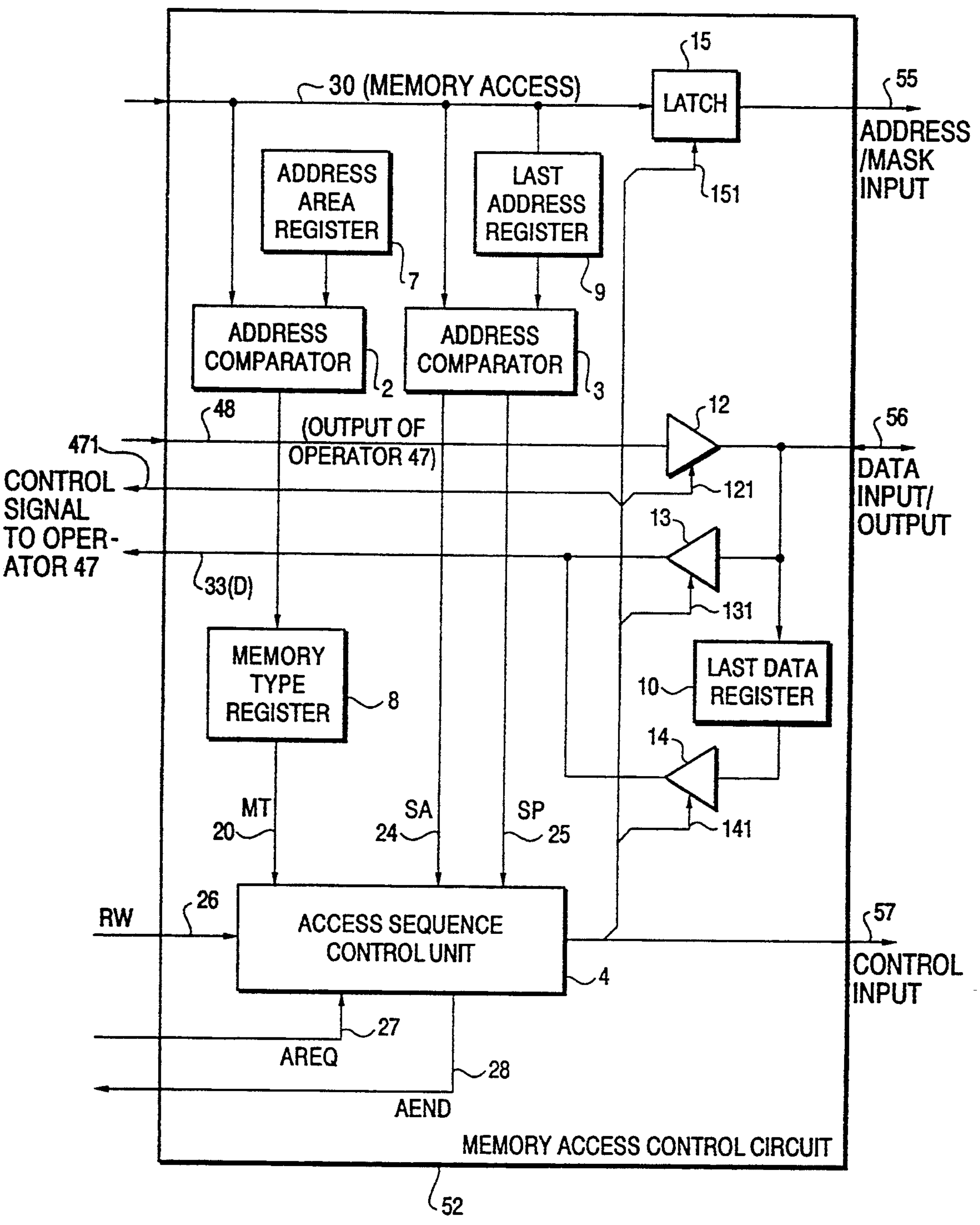
FIG. 6 is a block diagram representative of a third embodiment of the present invention.

Turning to FIG. 6, there is shown as a third embodiment of the present invention a memory access control circuit for a memory to which a page-mode access can be made, wherein the same constituents as those shown in FIGS. 1 and 4 are denoted by the same reference numerals. The memory access control circuit 52 according to this embodiment includes a last address register 9 for storing a memory address which was used in the latest memory access operation, a last data register 10 for storing data of a word accessed by the address stored in the last address register 9, and an address comparator 3 comparing the memory address 30 from the address generator 41 with the address stored in the register 9. When the memory address 30 is coincident with the address stored in the register 9, i.e. when both of page and word addresses of the memory address 30 are coincident with those of the address from the register 9, the comparator 3 changes SA signal output 24 to the high level. The comparator 3 further has SP signal output 25, the level of which is controlled by the comparison between only the page addresses of the memory address 30 and the address from the register 9 and is changed to the high level when both the page addresses thereof are coincident with each other. The codes to be sent to the memory type register 8 are designated in this embodiment as follows:

0: DRAM to which a page-mode access cannot be made

1: DRAM to which a page-mode access can be made

The MT signal 20, SA signal 24 and SP signal are used as access mode determination (and selection) information. In response to this information, the access sequence control circuit 4 selects and determines one of a plurality of access modes provided therein in accordance with the relationship shown in FIG. 7 and described in detail in the following:

I. RMW access request (RW=H)

Unless the conditions (1), (2) and (3) below are satisfied, RMW access mode is selected as an access mode to be used. RMW access operation is performed in the timing shown in FIG. 10 with the address/$\overline{\text{mask}}$ switching signal replaced by a $\overline{\text{page-mode}}$ signal for indicating a page-mode access to the memory 53.

(1) SA=1 and MT=0

In this case, the data of the latest memory access is copied in the register 10, and hence RMW access request can be changed to W access mode. W access operation is performed by the timing shown in FIG. 13 with the address/$\overline{\text{mask}}$ switching signal replaced by the $\overline{\text{page-mode}}$ signal.

(2) SA=H and MT=1

Figure 17:
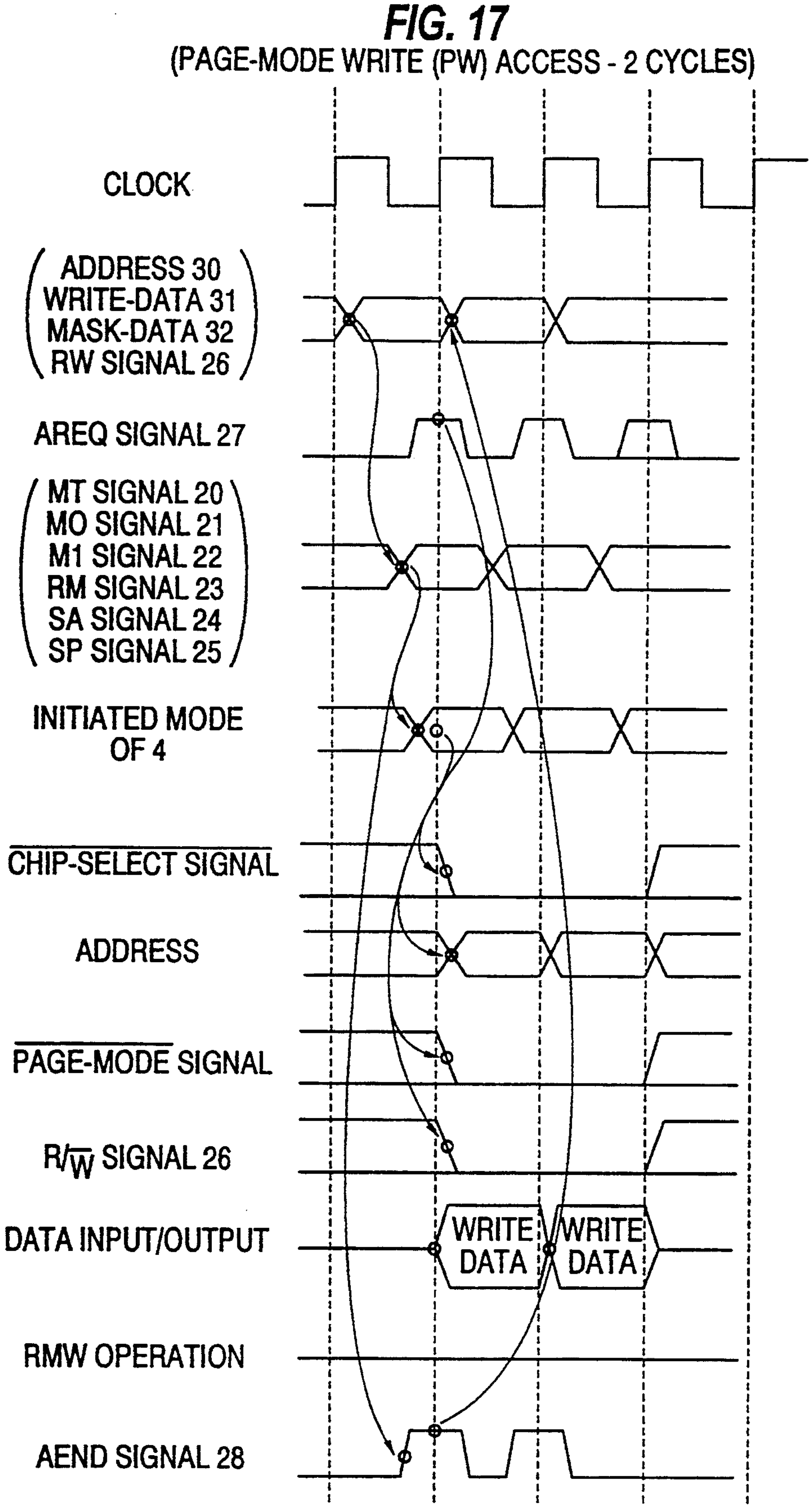
FIG. 17 is a timing chart representative of a page-mode write (PW) access.

Since the page-mode access can be used and the data of a word to be accessed is stored in the register 10, a page-mode write (PW) access is selected and performed in accordance with the timing shown in FIG. 17.

(3) SA=L, SP=H and MT=1

Figure 15:
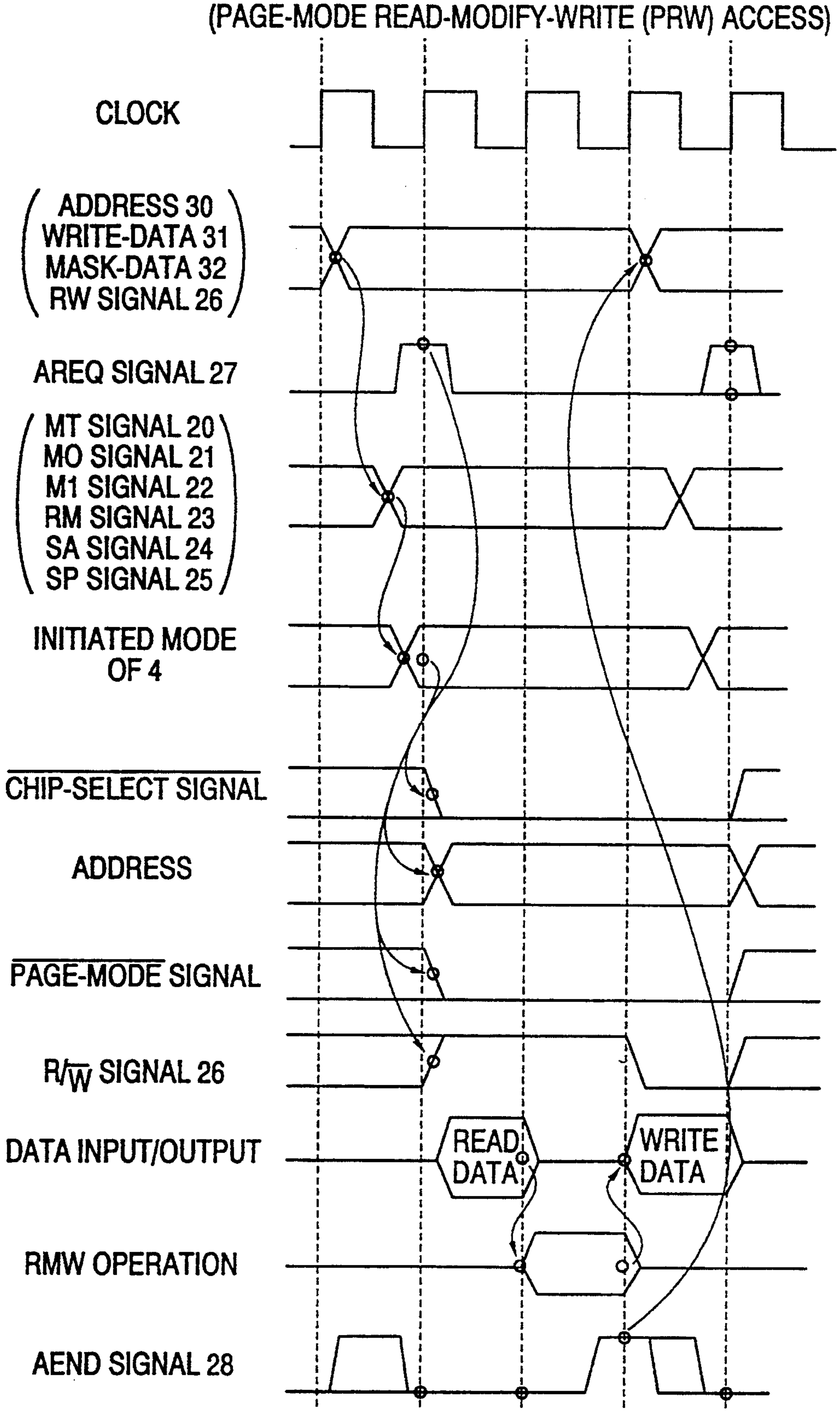
FIG. 15 is a timing chart representative of a page-mode read-modify-write (PRW) access.

Although the page-mode access can be utilized, the data stored in the register 10 is not equal to the data of a word to be accessed. Therefore, a page-mode read-modify-write (PRW) access is selected and performed in accordance with the timing shown in FIG. 15.

II. Read access request (RW=L)

Unless the following conditions (1) and (2) are satisfied, R access is performed by the timing shown in FIG. 12. The address/$\overline{\text{mask}}$ signal is replaced by the $\overline{\text{page-mode}}$ signal.

(1) SA=H

Since the data stored in the register 10 is equal to the data of the word to be accessed, the read access is omitted and becomes NOP.

(2) SA=L, SP=H and MT=1

Figure 16:
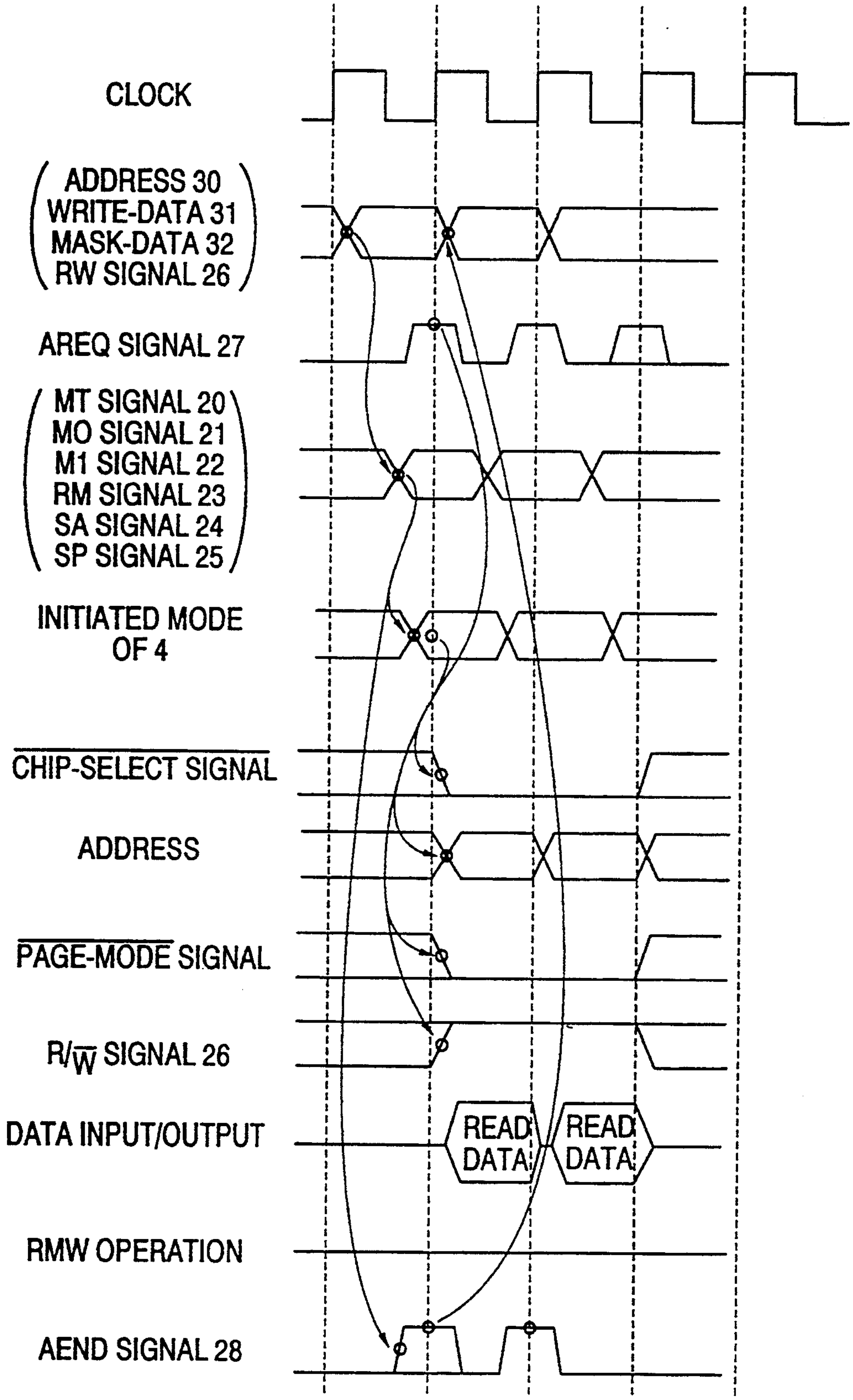
FIG. 16 is a timing chart representative of a page-mode read (PR) access.

Since page-mode access can be utilized, a page-mode read (PR) access is selected and performed in accordance with the timing shown in FIG. 16.

Thus, an access mode is determined and a memory access according to the selected access mode is performed by the access sequence controller. For preparation of the next memory access, the memory address 30 and data in the current memory access operation are stored in the registers 9 and 10, respectively. The data to be stored in the register 10 is read-data from the access word in case of read memory access or write-data into the accessed word in case of write memory access.

Referring again to FIGS. 8 and 9, there are further shown memory access modes utilizing page-mode accesses. The page-mode access is most effective in BitBlt operation. Specifically, as shown in FIG. 9 as Example 2, although. RMW access has to be used for the word i, PW access operation is performed on the words i+1 and i+2. The word i+3 is within the same page as the words i, i+1 and i+2. However, only one portion of the word i+3 has to be processed. Therefore, PRW access operation is performed on the word i+3. It is noted that in BitBlt operation, the drawing control unit 51 preliminarily stores word data of a source area into the register 44 by use of R access and/or PR access. On the other hand, a line drawing operation is represented in FIG. 8 by Example 3 and Example 4. Specifically, the page and word addresses of the pixels 2 and 3 are equal to those of the pixel 1 and the page and word addresses of the pixel 6 are equal to those of the pixel 5. Therefore, W access operation is performed on the pixels 2, 3 and 6 in case of employing a memory to which a page-mode access cannot be made (see Example 3). On the other hand, when a memory to which a page-mode access can be made is employed, PW access operation is performed on pixels 2, 3 and 6. Further, if the page address of the pixel 5 is equal to that of the pixel 4, PRW access operation is performed on the pixel 5. As a result, the respective access operations on the pixels 1 to 6 are shown as Example 4. The access times of the respective access operation are as follows:

PW access: 50 nsec

W access: 150 nsec
PRW access: 150 nsec
RMW access: 250 nsec

Thus, an optimum access mode is automatically selected to enhance the processing speed and efficiency.

It is apparent that the present invention is not limited to the above embodiments but may be modified and changed without departing from the scope and spirit of the invention. For example, the memory access control circuit 52 can be constructed to meet a memory to which both of WPB access and a page-mode access can be made, by combining the structures shown in FIGS. 4 and 6 and expanding the access selection modes shown in FIGS. 5 and 7. A memory other than three kinds of memories described above, for example a static random memory, can also be controlled by adding only the required access timing control circuit to the access sequence control circuit 4 and expanding the access mode selection sequence. The kinds of operations by RMW operator 47 may changed and expanded, if desired. The address space of the frame buffer memory 53 can be changed and further divided into a plurality of regions. In this case, the address region register 7 has a plurality of storage areas for storing upper and lower addresses of the respective address areas.

What is claimed is:

1. A memory access control circuit inserted between a data processing unit and a memory having a plurality of storage areas, said memory access control circuit comprising:

receiving means operatively coupled to said data processing unit for receiving an access request from said data processing unit, said access request including (1) access information containing a memory address which selects one of said storage areas of said memory and (2) access mode designation information which specifies a first memory access operation to be performed on said one of said storage areas of said memory to perform a predetermined data processing operation on said one of said storage areas of said memory, storing means for temporarily storing address information which corresponds to a part of said storage areas of said memory, each storage area contained in said part of said storage areas of said memory being accessible by said first memory access operation and further by a second memory access operation which performs a data processing operation equivalent to said predetermined data processing operation performed by said first memory access operation and at a faster speed than said first memory access operation.

generation means operatively coupled to said receiving means and said storing means for generating, in response to said memory address and said address information, an access change command signal taking a first state when said one of said storage areas of said memory selected by said memory address is outside of said part of said storage areas selected by said memory address and a second state when said one of said storage areas selected by said memory address is within said part of said storage areas of said memory, said second memory access operation initiated by said second stage of said access change command signal, access sequence control means operatively coupled to said memory and said generation means for performing said first memory access operation on said one of said storage areas of said memory when said access change command signal is in said first state and for performing, in place of said first memory access operation, said second memory access operation on said one of said storage areas of said memory when said access change command signal is in said second state, and each of said storage areas including a plurality of bits and said access request further including (1) mask data which specifies one or more bits of said plurality of bits of said one of said storage areas of said memory and (2) modifying data by which bit data of one or more bits specified by said mask data are replaced; said first memory access operation being a read-modify-write operation in which data is read out from said one of said storage areas of said memory, said data is modified by use of said modifying data to produce modified data and said modified data is written back to said one of said storage areas of said memory; each storage area of said part of said storage areas of said memory having a write-per-bit access mode in which, in response to mask information and replacement information supplied thereto, bit data of one or more bits specified by mask information are replaced by said replacement information; and said access sequence control means performing said second memory access operation to supply said mask data and said modifying data to said memory as said mask information and said replacement information when said access change command signal is in said second state.

2. A memory access control circuit inserted between a data processing unit and a memory having a plurality of storage areas, each of said plurality of storage area having a plurality of bits, said memory access control unit comprising:

receiving means operatively coupled to said data processing unit for receiving an access request from said data processing unit, said access request including (1) a memory address specifying one of said storage areas of said memory, (2) mask data specifying one or more bits of said one of said storage areas of said memory, (3) modifying data by which bit data of said one or more bits of said one of said storage areas of said memory are replaced, and (4) access mode designation information which specifies a read-modify-write access operation in which data is read out from said one of said storage areas of said memory, bit data of one or more bits thereof specified by said mask data are replaced by said modifying data to produce modified data, and said modified data is written back to said one of said storage areas of said memory;

generation means operatively coupled to said receiving means for generating control information which takes a first state when said mask data does not specify at least one of the bits of said one of said storage areas of said memory and a second state when said mask data specifies all the bits of said one of said storage areas of said memory, and access sequence control means operatively coupled to said receiving means, said generation means and said memory for performing said read-modify-write access operation when said control information is in said first state and for performing, in place of said read-modify-write access operation, a data write access operation to write said modifying data directly into said one of said storage areas of said memory when said control information is in said second state.

3. The memory access control circuit as claimed in claim 2, wherein control information generated by said generation means further takes a third state when said mask data specifies no bit of said one of said storage areas of said memory and said access sequence control means further performs no access to said one of said storage areas of said memory.

4. A memory access control circuit inserted between a data processing unit and a memory having a plurality of storage areas, each of said storage areas having a plurality of bits, said memory access control circuit comprising;

receiving means operatively coupled to said data processing unit for receiving an access request from said data processing unit, said access request including (1) a memory address selecting one of said storage areas of said memory, (2) mask data specifying one or more bits of said one of said storage areas of said memory for modifying data by which one or more bits of said one of said storage areas are replaced, and a (3) read-modify-write access operation in which data is read out from said one of said storage areas of said memory, bit data of one or more bits thereof are replaced by said modifying data to produce modified data, and said modified data is written back to said one of said storage areas of said memory;

generation means operatively coupled to said receiving means for generating control information which takes a first state when said memory address selecting said one of said storage areas of said memory is not identical with a preceding memory address used in a preceding memory access operation and a second state when said memory address selecting said one of said storage areas of said memory is identical with said preceding memory address, said generating means including a data register for temporarily storing data used in said preceding memory access operation; and access sequence control means operatively coupled to said receiving means, said generation means and said memory for performing said read-modify-write access operation where said control information is in said first state and for performing, in place of said read-modify-write access operation, a data write operation by use of said data stored in said data register when said control information is in said second state.

* * * * *